United States Patent [19]

Romanski et al.

[11] Patent Number: 5,307,427
[45] Date of Patent: Apr. 26, 1994

[54] NON-INTEGRAL PIXEL COMPRESSION FOR SECOND GENERATION FLIR SENSORS

[75] Inventors: John G. Romanski, Annapolis; Eliot M. Glaser, Catonsville, both of Md.

[73] Assignee: Westinghouse Electric Corp., Pittsburgh, Pa.

[21] Appl. No.: 754,776

[22] Filed: Sep. 4, 1991

[51] Int. Cl.$^5$ .............................................. G06K 9/36
[52] U.S. Cl. ................................... 382/56; 382/41; 358/432
[58] Field of Search .............. 382/47, 56, 41, 27; 358/133, 426, 432

[56] References Cited

U.S. PATENT DOCUMENTS

| | | | |
|---|---|---|---|
| 4,833,531 | 5/1989 | Abe et al. | 358/77 |
| 4,907,284 | 3/1990 | Ohuchi | 382/47 |
| 4,939,583 | 7/1990 | Tsuboi et al. | 358/261.1 |
| 5,038,389 | 8/1991 | Mizuno | 382/56 |
| 5,103,490 | 4/1992 | McMillin | 382/62 |

Primary Examiner—David R. Moore
Assistant Examiner—Andrew W. Johns
Attorney, Agent, or Firm—D. Schron

[57] ABSTRACT

A device, system and method of image processing and compression are preferably used with second generation infrared (IR) detector arrays where the pixel size is less than the optical blur of the system. Raw input pixels are compressed such that output pixels are more closely matched to the optical blur of the system. Further, the number of output pixels are compressed from a greater number of input pixels, based upon a selected input-to-output compression ratio. The ratio is not constrained to be of an integer value. The compression takes place using a plurality of neighborhood processors, each corresponding to a different output pixel type. Each neighborhood processor contains a plurality of different predetermined weighed fractions of input pixel data and are used to produce compressed output pixel data, based upon the selected input-to-output compression ratio and the output pixel type, for real-time processing.

16 Claims, 9 Drawing Sheets

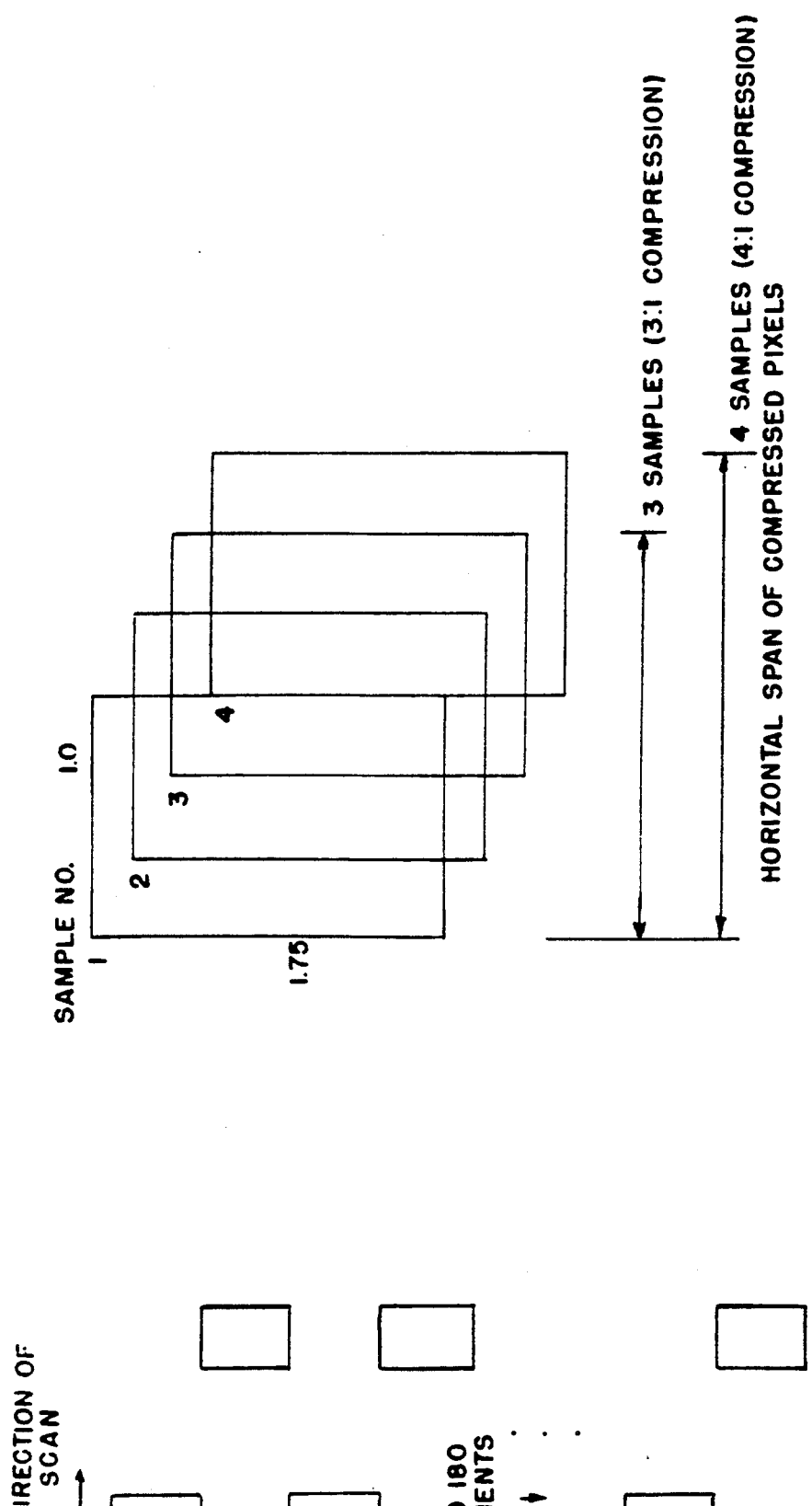

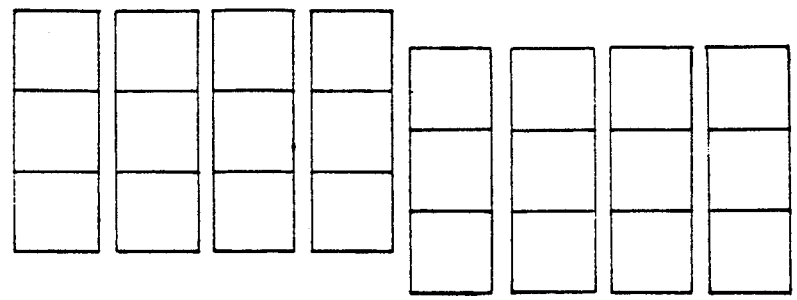
240 ELEMENTS    240 ELEMENTS
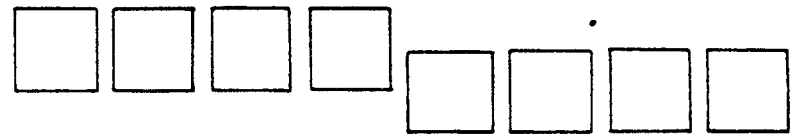
FIG. 3
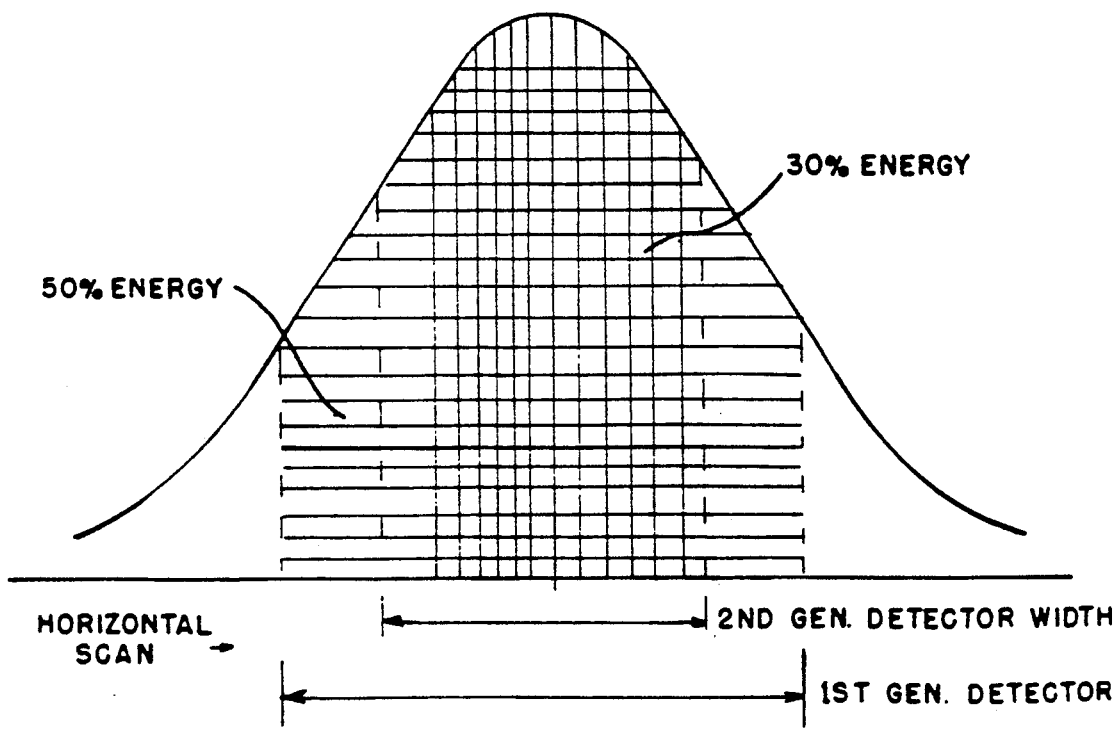
FIG. 4

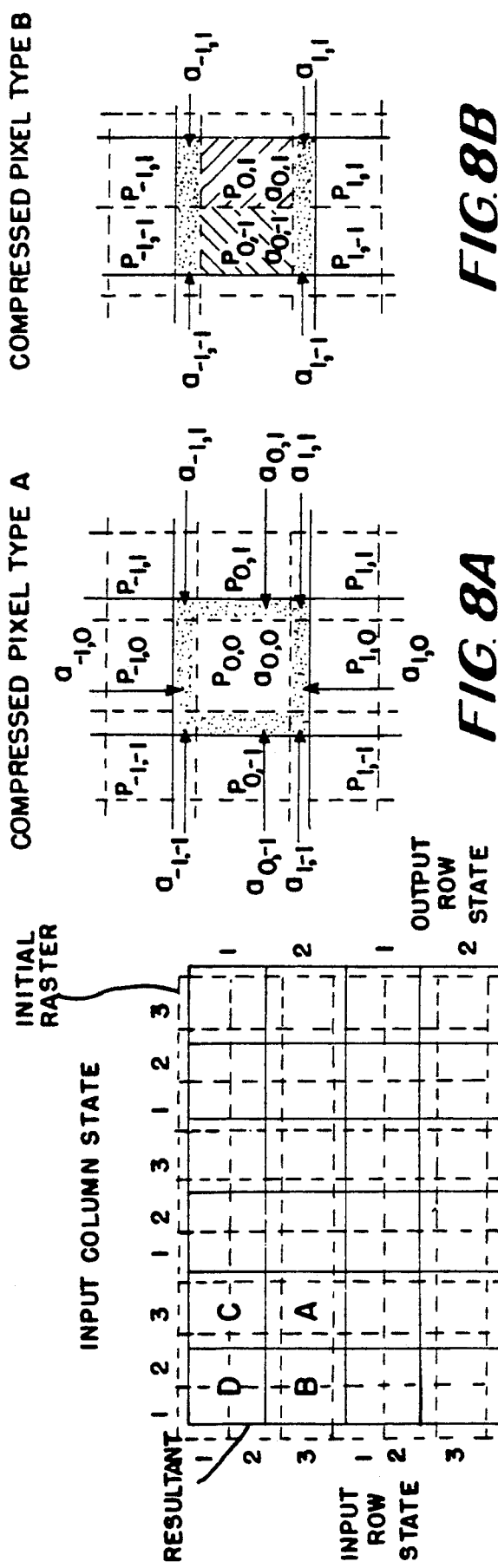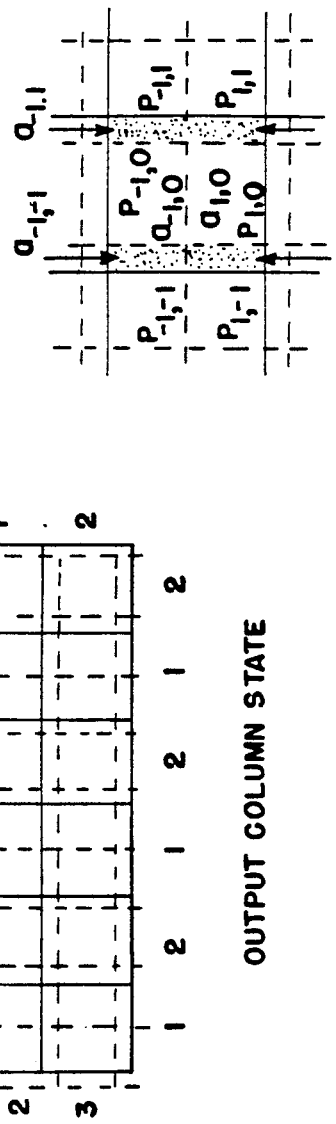

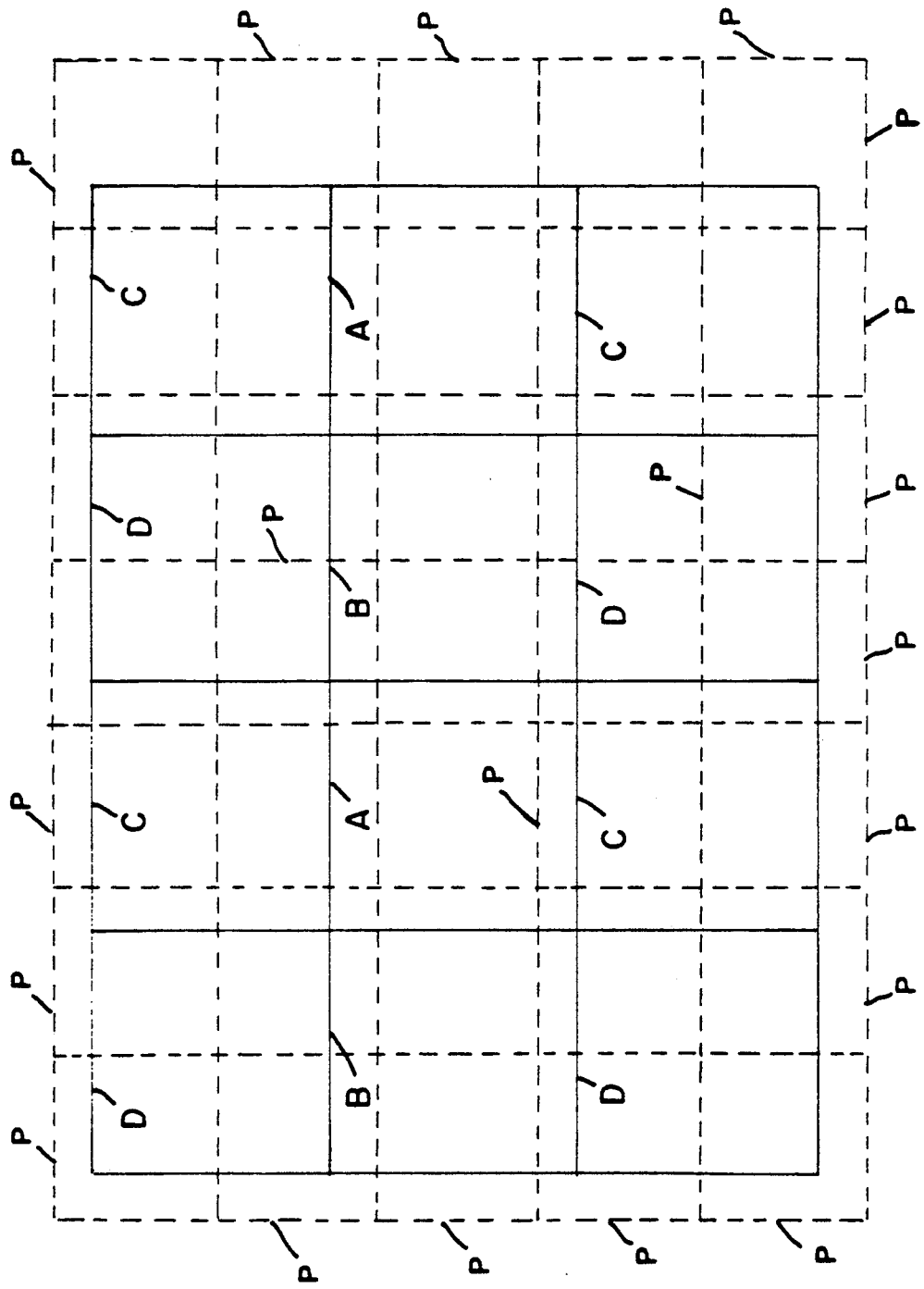

NON-INTEGRAL PIXEL COMPRESSION FOR SECOND GENERATION FLIR SENSORS

BACKGROUND OF THE INVENTION

The present invention relates to a system and method for pixel compression to reduce data rate and memory storage requirements in real-time processors. More particularly, it relates to non-integral pixel compression for second generation FLIR sensors.

Pixel compression is employed in present FLIR systems to reduce data rate and memory storage requirements of real-time processors used to analyze imagery. These systems typically consist of a vertical, staggered line array of 120 or 180 detector elements as illustrated in FIG. 2. The target, or image to be detected, is scanned across the detector perpendicular to the line array in the horizontal direction. Each detector element is sampled periodically as the scan proceeds, creating an array of pixels. The sampling frequency is such that each detector is sampled at least two times for each horizontal detector width. Higher sampling rates which yield two, four or even 10 samples per detector are not uncommon.

In most line array sensors, the situation is further complicated by the fact that the effective detector aspect is not square. The vertical dimension is typically 1.75 to 2 times greater than the horizontal dimension. Thus the raw pixels represent rectangular solid angle samples of the image. The rectangular nature of the sample is undesirable from the view point of machine processing of the image.

The operation of Pattern Recognizers and video trackers must be invariant to the aspect or viewing angle of the scene in order to achieve consistent performance. Thus if rectangular pixels are sampled, aspect angle changes would induce distortion in the scene. Pixel compressing is employed in the horizontal direction to produce square pixels for the machine processing functions. This is particularly true in multiple use sensors where the sampling rate is set by other requirements, most notably the one to produce an image pleasing to a human operator.

The usage of pixel compression in line array sensors is best understood by way of example. Consider a staggered line array detector consisting of two columns of 90 elements each. Each column is separated by an integer multiple of horizontal detector widths. The staggered nature is actually irrelevant to the sampling. The staggering can be removed electronically; but by separating the columns, a detector array, without gaps in the vertical coverage, can be manufactured. Effectively, 180 contiguous vertical samples are taken at each horizontal location.

Now in this example, the vertical dimension will be 1.75 times the horizontal dimension. Each element will be sampled 3 times as the scene is scanned across one horizontal detector width. FIG. 2 illustrates the coverage of a single detector element for several samples. The consecutive samples have been offset slightly in the vertical direction for clarity of presentation. If the scanning continues for a width equal to the total vertical dimension of the line array, then an array of $180 \times 945 = 170,100$ pixels results. If this is scanned in 12.5 msec., then the data rate is 13.6 Mhz. Note the comparative horizontal coverage of one, three and four pixels, as shown in FIG. 2.

Horizontal pixel compression can be applied to each channel individually. If three horizontal samples are combined (by averaging) into a single sample, then the effective size of a pixel is $1.75 \times 1.667$ angular units, yielding a 0.95 aspect ratio. The resulting array consists of $180 \times 315 = 56,700$ pixels and is generated with an equivalent data rate of 4.536 Mhz. If four samples are compressed into one, then the size is $1.75 \times 2.0$, yielding a 1.143 aspect ratio. The resulting array of pixels is $180 \times 236 = 42480$ and is generated at an effective data rate of 3.402 Mhz. The data rates and pixel totals resulting from pixel compression are more consistent with the capabilities of existing real-time programmable signal processors. Note that although the aspects are not square and thus do not yield an aspect ratio of 1.0, the aspect distortions are within acceptable limits. Thus pixel compression can be used to compensate for detector aspect distortion as well as reducing data rates and storage requirements. It is true that resolution will be lost in the horizontal direction, but to utilize the full resolution of a 180 by 945 array, processors beyond those which currently exist would have to be created.

A new generation of IR detector arrays comprise a detector configured as in FIG. 3. This is a $480 \times 4$ focal plane array With TDI (time delay integration). The latter is a feature which synchronizes the horizontal sampling of the four elements in the horizontal direction such that, as the scene is scanned, the signals of the 4 elements are added as each reaches the same angular position in the scene. When implemented properly, the 4 TDI elements are not germane to this discussion and the array can be considered an effective $480 \times 1$ array, with twice the signal to noise ratio afforded by an array of a single horizontal element. Other properties, however, are also very important. Unlike first generation devices, the aspects of detector elements are square. Also there is vertical interlace since the second column is offset by one-half an element in the vertical direction, from the first. Furthermore, there is comparatively (as compared to first generation devices) little dead space between detector elements. Each column, to a first approximation, can be thought of as providing contiguous coverage in the vertical direction.

The array elements are physically smaller than those typically encountered in first generation systems. They subtend a smaller solid angle, typically half that of conventional line arrays. This is important when considered in terms of total system resolution. The minimum resolvable angle of any FLIR system is determined primarily by the diameter of the objective lens. This establishes the blur circle of the sensor, which represents the angular spread of a point object at infinity induced by the sensor optics.

FIG. 4 illustrates the blur circle of a typical optical system as compared to the horizontal width of a first and second generation detector. The width of the blur circle is such that about 85% of the point energy is contained within the angle subtended by the first generation detector. On the other hand, only about 30 to 40% of the blur circle energy falls on each second generation detector. Thus the newer arrays are oversampled from a spatial point of view.

One possible way to fix this is to increase the aperture diameter. This decreases the blur circle width and by making the aperture large enough, the same relative percent of energy falling on the detector could be maintained. This is impractical, however, since the size of the objective lens is limited by system size, weight and cost constraints.

The oversampling could also be dealt with by simply increasing the number of samples. This too, however, is not desirable. It is useful to compare the sampling raster for a second generation array with the example of the first generation detector's sampling raster discussed earlier. For example, a 480×4 second generation array would generate a typical sampling raster of 480×960 elements. In the typical application, each dimension of the detector element of the second generation array is 0.8 of the horizontal angular subtense of the first generation array. This permits reduction of the electronic, horizontal sampling to two samples per horizontal detector width. Given the reduction in detector size, the 480×960 raster would cover ⅘ of the angular dimension, in each direction, of the first generation example. To cover the same angular area, (which would require more detector elements) the raster would have to be 720×1440 pixels. In either case, the number of pixels 460,800 (1,036,800) and the corresponding data rates 36,864 Mhz (82.944 Mhz.) are too high to be accommodated by existing array processors or those that will be available in the near future.

Despite the higher data and sampling rates required, the second generation detectors have advantages which can improve system performance. These include inherent vertical interlace and square pixels, as well as lower inherent noise. These are properties which are very desirable when the system is used to form an image for a human operator. Thus it would be desirable to find a way of reducing the number of samples used in a machine processor without affecting the image seen by an operator.

SUMMARY OF THE INVENTION

One object of the present invention is to solve the aforementioned problems.

It is an object of the present invention, therefore, to solve the aforementioned problems and to create a preprocessing method which reduces the number of pixels while still preserving the square aspect.

Another object of the present invention is to create a method of pixel compression which reduces data rate and memory storage requirements in real-time processors.

A further object of the present invention is to create a preprocessing device for compressing pixels to reduce data rate and memory storage requirements in real-time processors.

Still another object of the present invention is to create a method of non-integral pixel compression for second generation FLIR sensors.

Still a further object of the present invention is to create a non-integral pixel compression system for second generation FLIR sensors.

And yet another object of the present invention is to create a system and method which preserves the aspect ratio of the initial pixels in the preprocessed array upon compressing many pixels into a single pixel.

And yet a further object of the present invention is to alleviate straddle loss problems previously inherent in many-to-many compression mappings.

And still yet another object of the present invention is to create a method, system and preprocessing device which are useful in IR systems employing second generation detectors, to reduce memory size and data rate to those consistent with the processor for the proposed application.

And still yet a further object of the present invention is to create a system wherein a preprocessor can be used to tap the data stream without affecting the data sent to a display processor, which forms the image seen by the operator.

These and other objects of the present invention are fulfilled by providing an image compression system comprising a plurality of neighborhood processors, each, when selected, for producing data of an output pixel, of a different output pixel type predetermined by a preselected input-to-output pixel compression ratio, from a plurality of predetermined weighed fractions of data of a plurality of adjacent input pixels, predetermined based upon each output pixel type; and a control device for sequentially determining the output pixel type, for data of each sequential output pixel, based upon the preselected input-to-output pixel compression ratio, and for sequentially selecting one of said plurality of neighborhood processors corresponding to the determined output pixel type to sequentially control the plurality of neighborhood processors to produce data of a plurality of compressed output pixels from data of a plurality of input pixels in real-time. The objects are further fulfilled by providing an image compression system comprising scanning means for scanning an image and for producing input pixel data corresponding to the scanned image, preprocessing means for receiving the input pixel data, the preprocessing means including, a plurality of neighborhood processing means, each when selected, for producing output pixel data, of a different output pixel type predetermined by a preselected input-to-output pixel compression ratio, from a plurality of predetermined weighed fractions of data of a plurality of adjacent input pixels, predetermined based upon each output pixel type, and a control device for sequentially determining the output pixel type, for data of each sequential output pixel, based upon the preselected input-to-output pixel compression ratio, and for sequentially selecting one of said plurality of neighborhood processing means corresponding to the determined output pixel type to sequentially control the plurality of neighborhood processing means to produce data of a plurality of compressed output pixels from the input pixel data, in real-time, and a real-time processing means for processing the compressed output data in real-time.

The objects are still further fulfilled by providing a method of compressing input pixel data to output pixel data based upon a selected input-to-output compression ratio, comprising the steps of:

(a) inputting scanned input pixel data to a plurality of neighborhood processors;

(b) determining an output pixel type, based upon the selected input-to-output compression ratio;

(c) selecting one of the plurality of neighborhood processors, each for calculating data of an output pixel of a different output pixel type predetermined by the selected input-to-output compression ratio;

(d) calculating data of an output pixel, compressed by the selected input-to-output pixel compression ratio, by adding a plurality of weighed fractions of the scanned input pixel data of a plurality of predetermined adjacent input pixels, the weighed fractions of the adjacent input pixels being predetermined based upon each different output pixel type;

(e) repeating steps (a)-(d) to determine data for each compressed output pixel corresponding to the scanned input pixel data, based upon the selected input-to-output compression ratio, in real-time.

By utilizing the device, system and method of the present invention, upon suitably selecting the desired compression factor, the aspect ratio of the initial pixel is preserved in the preprocessed array. This differs from previous block compression techniques in that non-integer compression ratios are permitted, as well as a many-to-many ($3\times3\rightarrow2\times2$, for example) mapping. Systems utilizing $2\times2\rightarrow1$, $3\times3\rightarrow1$, etc., compression mappings have been constructed. These systems compress many pixels into a single output pixel. The method and system of the present invention generates more than one pixel in the output block. This gives the system designer more flexibility.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitive of the present invention, wherein, throughout the drawings, and specification, like reference numerals represent like elements, and wherein:

FIG. 1 illustrates a typical current generation IR detector array;

FIG. 2 illustrates a horizontal span of current methods of pixel compression or present generation IR detector arrays;

FIG. 3 illustrates a 480×4 IR detector array;

FIG. 4 illustrates the relationship of optical blur circle to the horizontal detector widths of first and second generation IR detector elements;

FIG. 7 illustrates a geometric relationship of a sampled (input) pixel array vs. a compressed pixel array;

FIGS. 8A-8D illustrate the compressed pixel types used in an exemplary embodiment of the present invention;

FIG. 10 illustrates input and output block grids;

The above-mentioned drawings will be described in detail in the following detailed description.

DETAILED DESCRIPTION OF THE PREFERRED EMBODIMENTS

The present invention, in a preferred embodiment, is directed to a pixel compression device, system and method for compressing pixels in both a horizontal and vertical direction to reduce data rate and memory storage requirements in real-time processors to improve the FLIR and tracking systems previously described. The device, system and method to be described hereinafter will be described with respect to an exemplary matrix of $3\times3$ contiguous blocks of raw (input) pixels being compressed to an exemplary matrix of $2\times2$ blocks of preprocessed pixels. Thus a 2.25 to 1 (9 to 4) data rate reduction will be achieved. The invention, however, is not limited to the previously described exemplary aspects.

Figure 5:
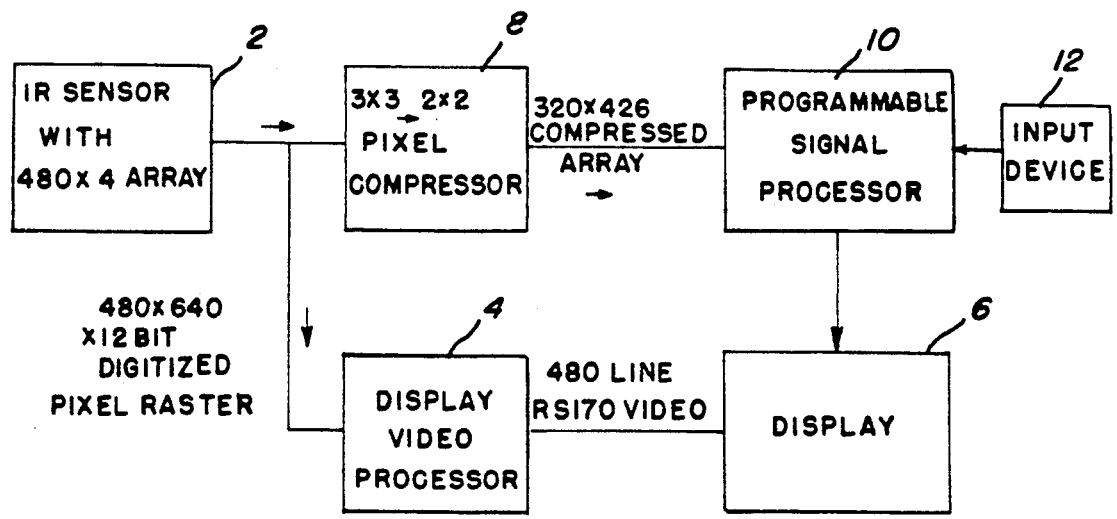
FIG. 5 illustrates a system of the present invention.

FIG. 5 illustrates a block diagram of a system of a preferred embodiment of the present invention for providing non-integral block pixel compression for second generation forward looking infrared (FLIR) sensors using a many-to-many ($3\times3\rightarrow2\times2$) mapping technique. The system includes an IR sensor 2, preferably with a 480×4 detector array, as previously described with regard to FIG. 3. The IR sensor 2 produces a 480×640 pixel raster (480×640×12 bit digitized pixel raster) which is sent to display video processor 4. The pixel raster of the IR sensor 2 is exemplary and should not be considered limiting. The display video processor is that of a conventional nature, producing 480 line RS 170 video data. Connected to the display video processor 4 is a display 6 for displaying the video data.

Further connected to IR sensor 2 is a pixel compressor 8. This pixel compressor is a preprocessing device, connecting a programmable signal processor 10 to the IR sensor 2. The preprocessing device 8 reduces the number of image samples used in the programmable signal processor 10 without affecting the image displayed to an operator via display 6. The preprocessing device taps the data stream without affecting the data sent to the display processor 4. The preprocessing device 8 is shown in FIG. 5 as a $3\times3\rightarrow2\times2$ pixel compressor for exemplary purposes only, and should not be considered limiting.

The preprocessing device 8 compresses the 480×640 pixel raster of IR sensor 2 into a 320×426 compressed array, which is input to programmable signal processor 10. Thus, the number of pixels is reduced, with the square aspect being preserved. Further, data rates and the pixel totals are more consistent with the capabilities of an existing real-time programmable signal processor 10. Subsequently, the programmable signal processor 10 can be utilized, through an input device 12 such as a keyboard, for example, connected to the programmable signal processor 10, to analyze the image data displayed on display 6. The display 6, therefore, being connected to programmable signal processor 10.

Figure 6:
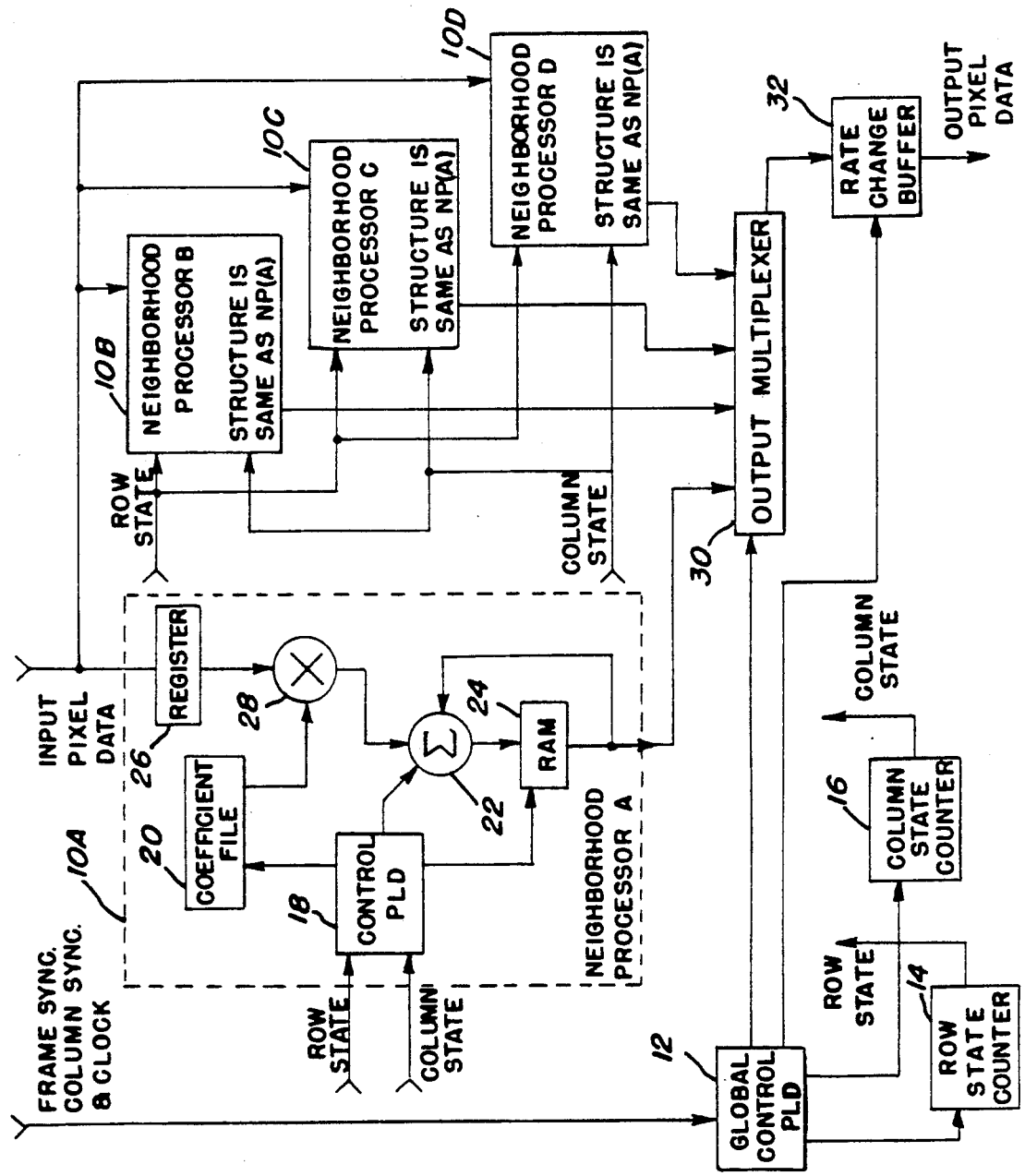
FIG. 6 illustrates a detailed view of the pixel compressor of FIG. 5.

FIG. 6 illustrates a block diagram of the preprocessor 8 shown in FIG. 5. The preprocessor 8, which is built from high speed digital building blocks, includes a control section and four (in the present example of $3\times3\rightarrow2\times2$ compression) identically structured neighborhood processors 10A-10D.

The preprocessor 8, connected to the IR sensor 2 with the 480×4 array, receives pixel data, column sync signal, frame sync signal and a high speed clocking from the FLIR sensor 2. The pixel data from the FLIR sensor 2 is word-serial, burst multiplexed detector data. Each burst represents the readout of one entire column of detectors. A frame is made up of several hundred of such bursts.

A global control programmable logic device (PLD) 12, of the preprocessor 8, receives the information from the FLIR sensor 2 and synchronizes operation of the four neighborhood processors 10A-10D with the incoming FLIR data stream. Specifically, the global control PLD 12 is connected to a row state counter 14 and a column state counter 16. Preferably, these row and column state counters are modulo counters controlled by global control PLD 12. The row state counters 14 and the column state counters 16 are then each subsequently connected to each of the neighborhood processors 10A-10D, as shown in FIG. 6, in a manner to be subsequently described.

The pixel compression sequence (to be described subsequently), is a pattern that repeats every fourth row and every fourth column (in the present exemplary 3×3→2×2 compression). Such a pattern is used by global control PLD 12 (via preliminary programming of the PLD) to control the row and column state counters 14 and 16. The row and column states comprise the total processor state and are sent to all four neighborhood processors, each of which performs and operates on the total processor state.

Each neighborhood processor 10A-10D is similarly structured. Thus, the structure of neighborhood processor 10A will be discussed in an exemplary fashion representing the structure of 10A-10D. There is one neighborhood processor assigned to each of four possible pixel types (as will be described subsequently, in an exemplary manner representing the 3×3→2×2 compression). It should be noted that for different compressions, additional or different neighborhood processors would be used, as would be recognizable to those of ordinary skill in the art from the present specification.

Each neighborhood processor, as is illustrated in FIG. 6, with regard to processor 10A, includes a control PLD 18 for receiving the row and column states from the row state counter 14 and the column state counter 16, respectively. The control PLD 18 is connected to a coefficient file 20, which is a memory storing a plurality of coefficients (to be described later) which is unique to each of the four neighborhood processors 10A-10D. The coefficient file is connected to an input of a multiplier 28.

Further, also connected to another input of multiplier 28 is a register 26. The register 26, for each of the processors 10A-10D, is connected to FLIR sensor 2 and receives input pixel data. Thus, by a method to be described subsequently, the control PLD 18 selects a coefficient to be multiplied (in multiplier 28) by input pixel data (sent to multiplier 28 via register 26), to produce a resultant output.

Still further, control PLD 18 is connected to one input of an adder 22. Further, multiplier 28 sends the resultant output to another input of adder 22. The output of the adder 22, along with the control PLD 18, are connected to a small local RAM 24 within each neighborhood processor 10A-10D. Further, as shown in FIG. 6, the output of RAM 24, for each of the neighborhood processors 10A-10D, is commonly input to an output multiplexer 30, and is further tapped and input to each adder 22. Thereby, the control PLD 18 can control update of the local RAM 24, control initialization of each RAM location by adding zero (output zero to the input of adder 22) to the output of multiplier 28, and control output of a completed pixel computation from the neighborhood processor 10A-10D, based upon the input row and column states in a manner to be described subsequently. This structure further allows for only a small amount of RAM to be required within each neighborhood processor, namely only that equal to one-half of the number of detectors in a column divided by the compression ratio (for the 3×3→2×2 present example with 480 detectors, namely that of 240/(3/2)=160 memory locations).

Each of the outputs of a completed pixel computation from RAM 24, for each of processors 10A-10D is then output to output multiplexer 30 to be recombined into a word-serial data stream. The global control PLD 12 is further connected to multiplexer 30 and controls the output of the word-serial data stream to rate change buffer 32. This rate change buffer 32 can be, for example, a FIFO (first in, first out) buffer, which can then be read out at a slower data rate.

The method for compressing pixels in a 3×3 initial block into a smaller 2×2 block will now be described. The relationship of the initial and compressed pixel rasters, with the input (sampled) pixels being represented by dashed (---) lines, and the output compressed or resultant pixels being represented by continuous (__) lines. Note that the number of raw (input) pixels that a compressed pixel encompasses is spatially dependent. For the 3×3 to 2×2 compression, four different spatial combinations, or compressed pixel types are required. These are designated A, B, C and D, as are shown in FIG. 7. Thus, the compression mechanism must identify which of the four types categorizes a given compression pixel, then access the appropriate raw or initial raster pixels and process them according to one of four transformations involving application of a particular pixel weight assigned based upon type A→D and relative pixel location. Thus, each pixel will be appropriately weighed with such a corresponding coefficient as described below to thereby achieve an accurate representation of the original image within the compressed image. The four cases involved in the present compression are:

1. Type A: CENTER

This occurs when the geometric center of a compressed pixel occurs at the geometric center of a raw pixel. For this situation, the compressed pixel, P' is formed from the 9 adjacent raw pixels, $\{P_{ij}\}$. $P_{0,0}$ indicates the pixel coincident with the center. The transformation is:

$$P' = .02777P_{-1,-1} + .11111P_{-1,0} + .02777P_{-1,1} + \quad (1)$$

$$.11111P_{0,-1} + .44444P_{0,0} + .11111P_{0,1} +$$

$$.02777P_{1,-1} + .11111P_{1,0} + .02777P_{1,1}$$

2. Type B: VERTICAL BOUNDARY

This situation is encountered when the center of a compressed pixel occurs on a vertical boundary line of two adjacent horizontal raw pixels. The compressed pixel is formed by:

$$P' = .08333P_{-1,-1} + .08333P_{-1,1} + \quad (2)$$

$$.33333P_{0,-1} + .33333P_{0,1} + .08333P_{1,-1} + .08333P_{1,1}$$

3. Type C: HORIZONTAL BOUNDARY

This occurs when the center of a compressed pixel falls on a horizontal line boundary between two raw vertical elements. The transformation is:

$$P' = .08333P_{-1,-1} + .33333P_{-1,0} + .08333P_{-1,0} \qquad (3)$$
$$.08333P_{1,-1} + .33333P_{1,0} + .08333P_{1,1}$$

4. Type D: CORNER

This occurs when the center of a compressed pixel falls on a corner where four raw pixels join. The transformation is:

$$P' = .25P_{-1,-1} + .25P_{-1,1} \qquad (4)$$
$$.25P_{1,-1} + .25P_{1,1}$$

The compression is implemented by scanning through the new or compressed array, then determining which raw pixels and which transformation is required to achieve the combination. Note that this particular compression scheme is characterized by only four different transformations. This is merely exemplary of use in a $3 \times 3 \to 2 \times 2$ compression. Other (than $3 \times 3 \to 2 \times 2$) schemes may require different and more transformations which would be recognizable, in lieu of the previously mentioned method, to those of ordinary skill in the art.

The preprocessing method to reduce the data rate while preserving square aspect ratio pixels will be described hereinafter. The implementation is demonstrated for the case of a $480 \times 4$ second generation detector array that is sampled such that a two-dimensional array of square pixels is generated. The pixels will be horizontally and vertically compressed by a factor of 9:4 (or $3 \times 3:2 \times 2$). FIG. 7 illustrates the geometric relationship between the sampled pixel array (input pixels) and the compressed pixel array (output pixels). The compression ratio is chosen in order to match the compressed pixels to the optical blur circle in order to achieve a more efficient pixel sampling map. The pixel boundary grids are offset as indicated in order to reduce straddle loss.

Straddle loss problems are alleviated in the many to many compression mappings. Such straddle losses occur when point sources (such as the targets to be detected) fall on block boundaries, in between two pixels. Many-to-one compression mappings reduce the point amplitude by 50% in such situations. In a many-to-many compression mapping, the straddle loss in amplitude is less. In applications with regard to IRST (infrared search tracking), the reduction in straddle loss may improve range performance by 50%. Thus, if a target is detected between pixels, it will be detected as its true range, instead of a distance 50% of its true range.

The device, method and system of the present invention are useful in IR systems employing second generation detectors where it is desired to reduce the data rate while preserving the aspect and a portion of the vertical interlace feature. FIG. 5 is a block diagram of such an application. In this particular example, the compression technique is used to reduce the pixel raster from $480 \times 640$ pixels to $320 \times 426$ pixels. This yields a memory size and data rate consistent with the processor for the proposed application.

Each compressed pixel is computed as the sum of the appropriate fraction of the area of the input pixels that are subtended by the compressed pixel. This is shown in FIG. 8, where pixel A is computed via equation (1) above. Examination of FIG. 7 indicates that the weighing factors (coefficients stored in the corresponding coefficient file 20 of each processor 10A→D) $a_{ij}$ are not equal for all output pixels. This is due to the fact that there are four different types of compression mappings, in the present example. As a result, there are four sets of weighing factors required to generate all of the output pixels. Pixel types B, C, and D are also shown in FIG. 8; each having a unique set of weighing factors. These computations, which must be performed in real-time, represent a level of complexity that previous methods of performing pixel compression were not capable of.

Figure 9:
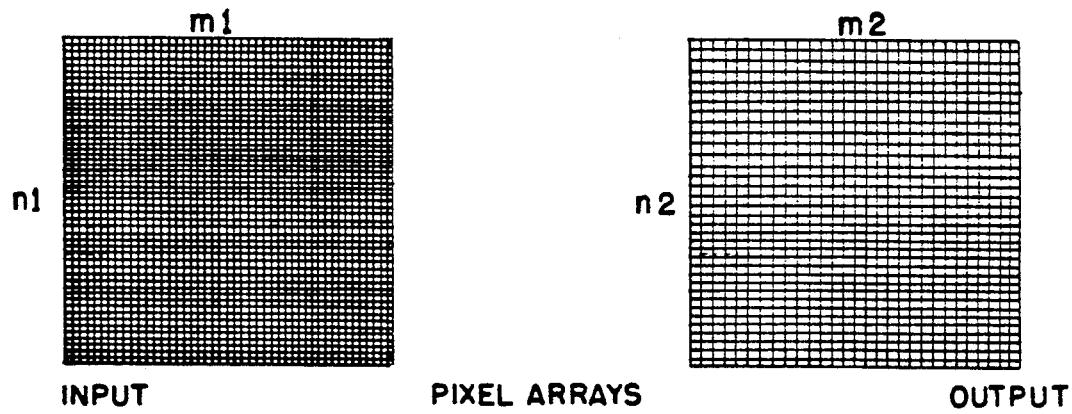
FIG. 9 illustrates input and output pixel arrays.

In first constructing an operational preprocessing device, such as that of FIG. 6, one must first determine an appropriate input array ($n1 \times m1$, wherein m1 and n1 are integers representing horizontal and vertical array input dimensions) of pixels (such as that which will be received from IR sensor 2) and a desired output compressed array $n2 \times m2$ (m2 and n2 being integers representing horizontal and vertical array output dimensions), such as those shown in FIG. 9. With an $n1 \times m1$ input array of pixels, it is desired to produce an $n2 \times m2$ pixel array covering the same angular extent, wherein: $n2 < n1$ and $m2 < m1$.

Vertical (CV1:CV2) and horizontal (CH1:CH2) compression ratios must be selected such that CH2 (the horizontal compression number of the output array) is the least integral number of pixels in the output array which will span the same space as the CH1 (the horizontal initial number of the input array) pixels, also being an integral number, of the input array. In a similar manner, CV2 (the vertical compression number of the output array) and CV1 (the vertical initial number of the input array) must be selected, wherein CH1 > CH2 and CV1 > CV2.

In the present example, CV1 = CV1 = 3 and CH2 = CV2 = 2. The overall method will thus, in the present example, convert and compress CH1 × CV1 blocks of pixels from the input array to CH2 × CV2 blocks in the output array. In this example, 9 pixel blocks will be converted to four pixel blocks. It should be noted that there is no requirement that the vertical and horizontal compression ratios be the same and thus the present invention should not be considered, in any way, limited to such.

The next step in constructing an operational processing device is to determine a mapping transform. Thus, having determined the desired compression factors, the number of possible mappings and the transform constants (A–D in the present example), for each, must be determined. This can be done by, for example, constructing grids of input and output blocks and overlaying them, as is shown in FIG. 10. This can be done by any of a number of methods easily recognizable to one of ordinary skill in the art in lieu of the present disclosure to identify the number of unique transforms (4, corresponding to A,B,C and D of FIG. 10, in the present example). In general, there are CH2 × CV2 unique transforms required.

In order to convert input pixels to output pixels, these output pixel types are identified. The phasing of the grid is then adjusted such that one input pixel is symmetrically contained within one output pixel (as shown in FIG. 10, the A type output pixel fully contains one input pixel). Thereafter, the transformation coefficients to be loaded into coefficient files 20 each of the neighborhood processors 10A–10D can then be developed in the manner previously described with regard to FIG. 8. These transformation coefficients are merely the relative areas of the original pixels contained within the output pixels. This completes the construction and set up of the preprocessing device 8. The preprocessing 8, constructed as previously described and originally described with regard to FIG. 6, is thus programmed with the obtained data in a manner well known to those of ordinary skill in the art in lieu of the aforementioned disclosure.

Figure 11:
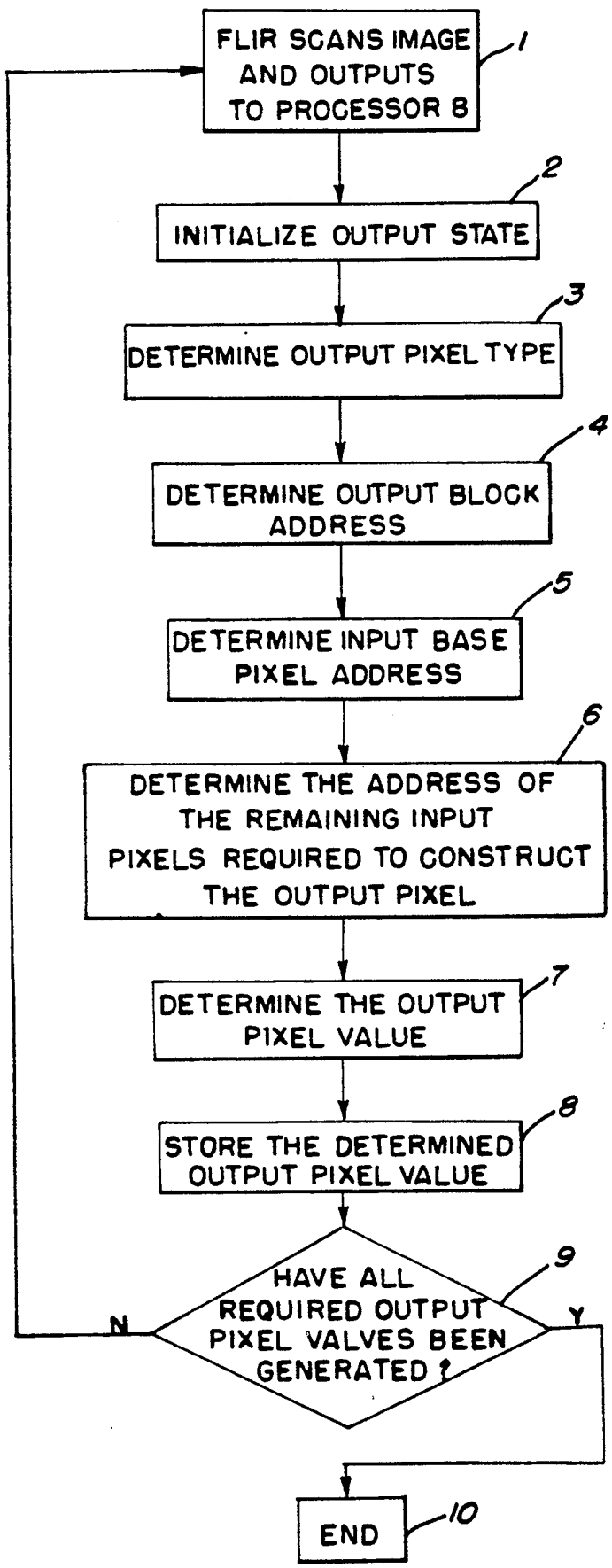
FIG. 11 illustrates a flowchart of the method implemented by the system, including the preprocessing device of the present invention.
Figure 12:
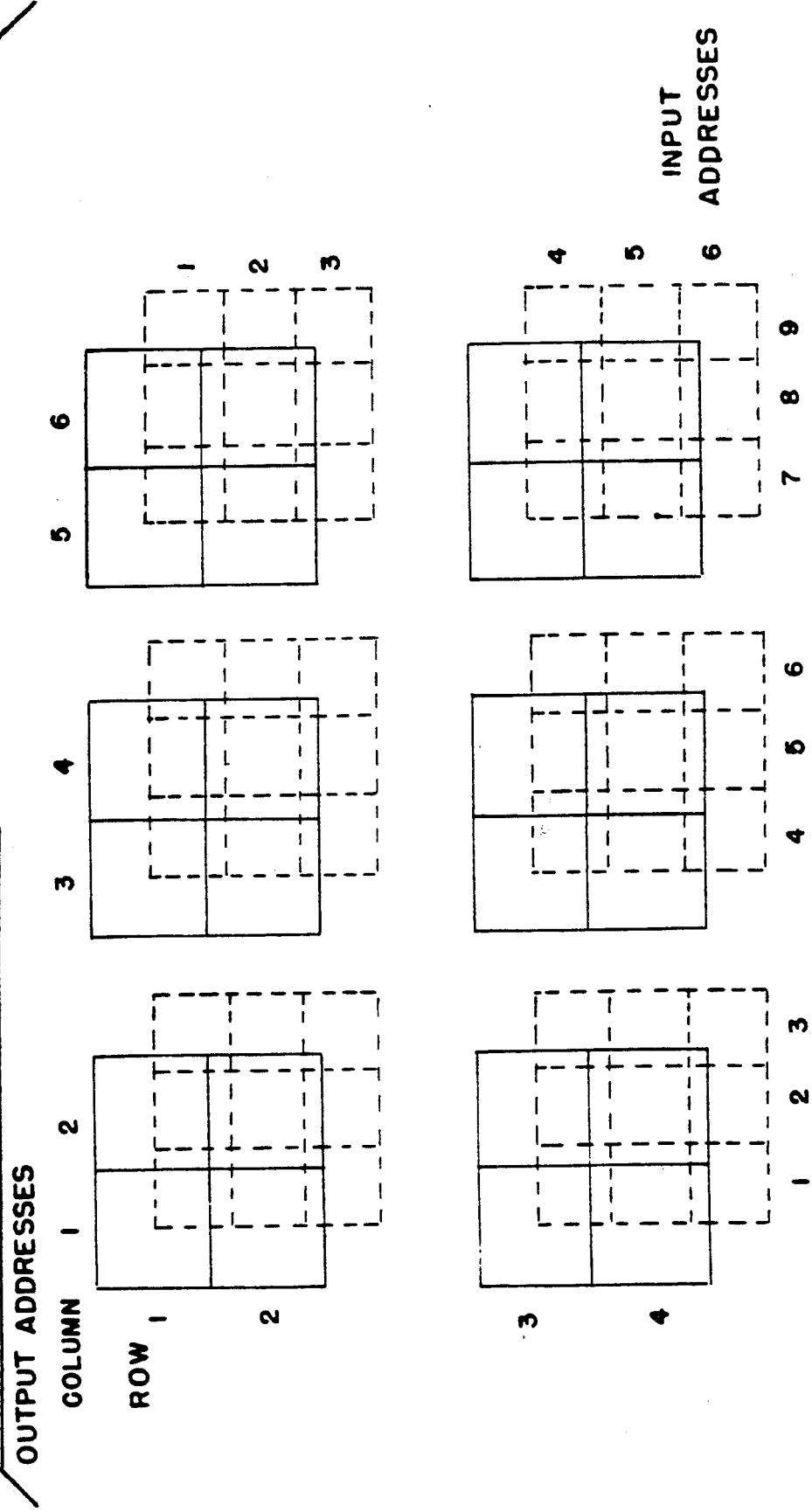
FIG. 12 illustrates an input and output address mapping.
Figure 13:
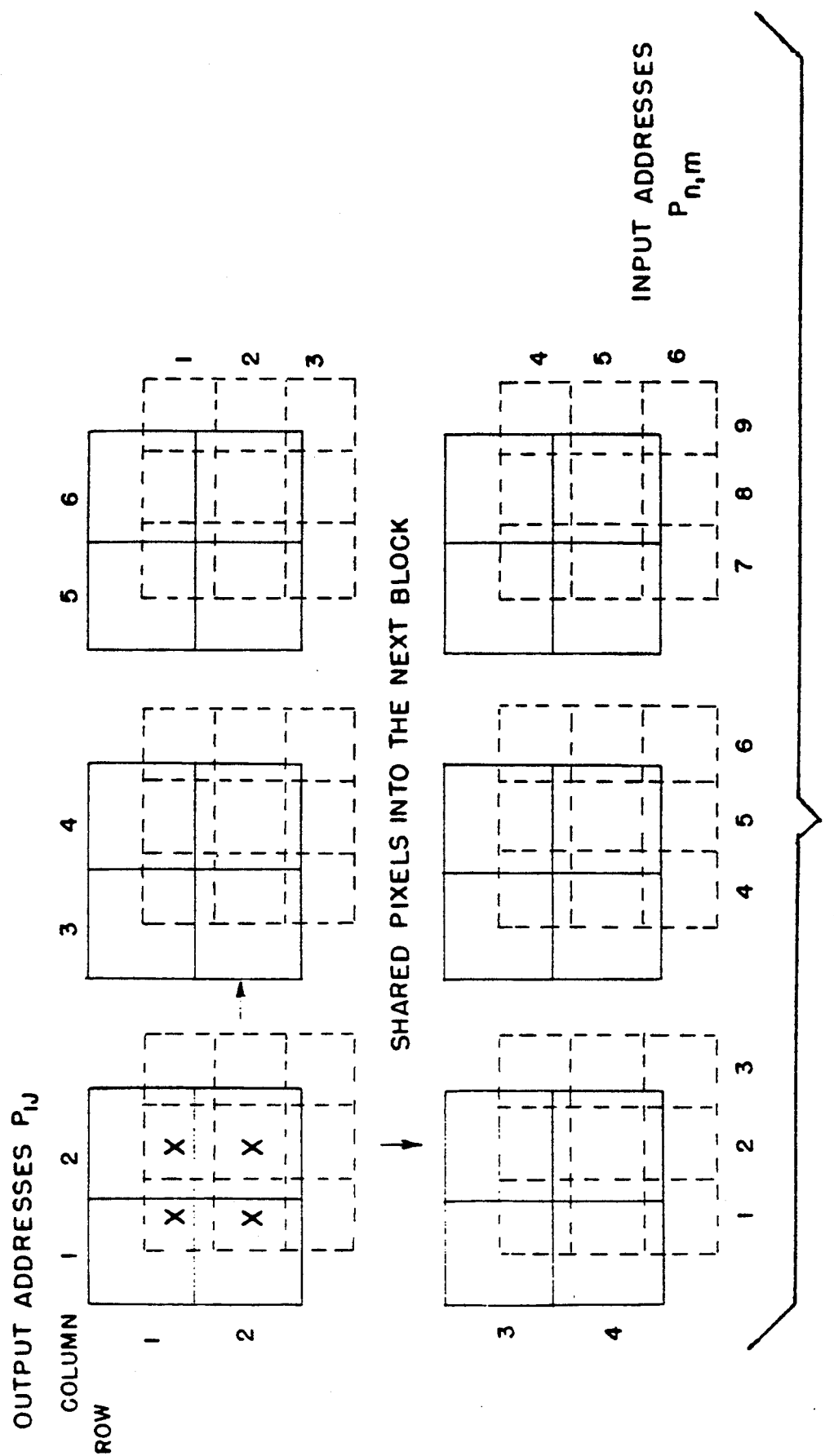
FIG. 13 illustrates output block address determination.

The method of operation of the preprocessing device thus constructed, in conjunction with the system of FIG. 5, will subsequently be described with regard to the flowchart of FIG. 11 and subsequent FIGS. 12-13.

Initially, in step 1, the FLIR sensor 2 scans the image and creates input pixel data of a 480×640 array and further generates the frame and column synchronizing signals and the clock signals. This information is sent to the preprocessing device 8. The input scanned image data is then referenced to the output array. The upper left corner pixel is considered $P_{11}$ (where the row or horizontal address is the first integer and the column or vertical address is the second integer). A mapping of the output addresses appears as columns across the top and rows on the left in FIG. 12. Further, the input address appears as columns across the bottom and rows on the right in FIG. 12. This is the initializing of the output state of step 2, done through global control PLD 12.

In step 3, the output pixel type is determined. This is achieved by modulo arithmetic on the row-column output pixel address via row state counter 14 and column state counter 16. By letting $P_{IJ}$ be the location of the input pixel that is currently being scanned, (I being the row and J being the column), pixel $P_{IJ}$ can then be output pixel type (A,B,C, or D in the present example) classified by the following process: K=I modulo CV2 and L=J modulo CH2. Thus, using modulo arithmetic, the value of K and L are that of the reminder when I and J are respectively divided by CV2 and CH2. The output pixel type, upon obtaining a value for K and L (for the present example) can be assigned as follows:

| Pixel Type | K | L |
|---|---|---|
| A | 0 | 0 |
| B | 0 | 0 |
| C | 1 | 0 |
| D | 1 | 1 |

In step 4, the output block address ($B_I$=block row address and $B_J$=block column address) is then determined by the following equations:

$$B_I = [(I+1)/CV2] \text{ and} \quad (5)$$

$$B_J = [(J+1)/CH2], \quad (6)$$

wherein I equals the row, J equals the column and CH2=CV2=2 in the present example. The process can be seen with regard to FIG. 13, wherein "x" denotes base pixels.

In step 5, having found the block address and output pixel type, the address of the input base pixel $P_{nm}$ (n being row and m being column) is determined by:

$$n = CV1*(B1-1)+1+KBAR \text{ and} \quad (7)$$

$$m = CH2*(BJ-1)+1+LBAR. \quad (8)$$

wherein KBAR and LBAR are the compliments of the 0 and 1 values of K and L used to determine the output pixel type. Thereafter, in step 6, the addresses of the remaining input pixels required to construct the output pixel, as previously described with regard to FIGS. 7 and 8, are determined based upon the determined input base pixel address and the output pixel type, as illustrated in Table I below:

TABLE I

| TYPE | INPUT PIXELS REQUIRED ($P_{n,m}$ = base pixel) | | |
|---|---|---|---|
| A | $P_{n-1,m-1}$ | $P_{n-1,m}$ | $P_{n-1,m+1}$ |
|   | $P_{n-1,m}$ | $P_{n,m}$ | $P_{n,m+1}$ |
|   | $P_{n+1,m-1}$ | $P_{n+1,m}$ | $P_{n+1,m+1}$ |
| B | $P_{n-1,m-1}$ | $P_{n-1,m}$ | |
|   | $P_{n,m-1}$ | $P_{n,m}$ | |
|   | $P_{n+1,m-1}$ | $P_{n+1,m}$ | |
| C | $P_{n-1,m-1}$ | $P_{n-1,m}$ | $P_{n-1,m+1}$ |
|   | $P_{n,m-1}$ | $P_{n,m}$ | $P_{n,m+1}$ |
| D | $P_{n-1,m-1}$ | $P_{n-1,m}$ | |
|   | $P_{n,m-1}$ | $P_{n,m}$ | |

Thereafter, in step 7, the appropriate neighborhood processor 10A-10D then determines the output pixel value by applying the appropriate transformation to the input pixels as shown below. Thus, each compressed pixel is computed based upon the fraction of the area of each row pixel subtended by the appropriate compressed pixel type (as shown below), incorporating the previous notations of FIG. 8 and Table I.

$$\text{OUTPUT PIXEL } P_{IJ} = a_{-1,-1}*P_{n-1,m-1} + a_{-1,0}*P_{n-1,m} + \quad (9)$$
$$a_{-1,+1}*P_{n-1,m+1} +$$
$$a_{0,-1}*P_{n,m-1} + a_{0,0}*P_{n,m} +$$
$$a_{0,+1}*P_{n,m+1} +$$
$$a_{1,-1}*P_{n+1,m-1} + a_{1,0}*P_{n+1,m} +$$
$$a_{1,1}*P_{n+1,m+1}$$

wherein the coefficient matrix is:

$$\mathcal{I} = \begin{matrix} a_{-1,-1} & a_{-1,0} & a_{-1,1} \\ a_{0,-1} & a_{0,0} & a_{0,1} \\ a_{1,-1} & a_{1,0} & a_{1,1} \end{matrix} \quad (10)$$

Thus, depending on pixel type T, being one of A-D, in the present example the prestored corresponding coefficients within the neighborhood processor corresponding to the determined pixel type, will be applied. T=A,B,C, or D where the prestored coefficients for each of the neighborhood processors are:

| A | | | B | | |
|---|---|---|---|---|---|
| .02777 | .11111 | .02777 | .08333 | .08333 | 0.0000 |
| .11111 | .44444 | .11111 | .33333 | .33333 | 0.0000 |
| .02777 | .11111 | .02777 | .08333 | .08333 | 0.0000 |

| C | | | D | | |
|---|---|---|---|---|---|
| .08333 | .33333 | .33333 | .25 | .25 | 0.0000 |
| .08333 | .33333 | .08333 | .25 | .25 | 0.0000 |
| 0.00000 | 0.00000 | 0.00000 | 0.00 | 0.00 | 0.0000 |

Once determined, the output pixel value is then stored in step 8. It should further be noted that, as shown above, if any of the input pixel values required (in output pixel determination), extend beyond the edges of the input pixel array, the zero (as shown above representing pixel types A-D previously described with regard to FIGS. 7 and 8) or the nearest array value, may be substituted at the designer's option.

A determination is then made in step 9, whether or not all required output pixels have been generated. If not, the method then reverts back to step 1 for determination of the next output pixel. If all required output pixels have been generated, the method then ends in step 10.

There are several aspects of the present invention, with regard to the previously described method implemented by the system of FIG. 5 and specifically the preprocessor 8 of FIG. 6, which are unique. First, there is minimal data latency since computations are performed in real-time, each result is output in a minimum number of clocks after the last required data point for that result is available. The preprocessor operates in the output pixel coordinate space, and the transition is made as each input pixel is received.

Parallel and pipelined processing techniques are combined to achieve a high throughput while operating at the same clock rate that the data is generated at; this makes the implementation inexpensive since generic devices can be employed. The control PLD's and the coefficient files are initialized by a general purpose CPU (not shown, but which is already resident in the system to perform other tasks) and the preprocessor is programmable in terms of the compression ratio and aspect ratio. Programmability makes the preprocessor capable of generating square aspect ratio pixels given a particular sensor that outputs rectangular pixels, or vice-versa, if required by the application. Further, the preprocessor is expandable to meet these alternate applications by adding additional neighborhood processors as required.

The device, system and method hereinbefore described is intended to be preferably used in a system with second generation IR detector arrays where the pixel size is less than that of the optical blur of the system. This device, system and method combine raw pixels such that the output or compressed pixels are more closely matched to the optical blur of the system. In addition, the number of output pixels are reduced (in the example presented here, by a factor of 2.25) which enables the use of current generation signal processors in second generation IR systems. This achieves a significant savings in terms of cost.

The pixel compression method presented hereinbefore described is unique in that fractional areas of primitive pixels are utilized. Unlike previous techniques, which were constrained to use only whole pixel blocks and generated a single output pixel, this method generates a smaller pixel array for any given input collection. One advantage of this lies in the reduction of straddle loss. This can be translated into improved range performance in IRST systems. The implementation presented provides a minimal data latency path. Although illustrated for the $3 \times 3$ to $2 \times 2$ scheme, the architecture is independently programmable in each dimension such that other blocking ratios can be achieved, and thus should not be considered to be, in any way, limited to such a $3 \times 3 \rightarrow 2 \times 2$ compression scheme.

It should be noted that the present system is merely exemplary, for use in a $3 \times 3 \rightarrow 2 \times 2$ pixel compression. Accordingly, in other types of compressions, a plurality of additional or different neighborhood processors would be necessary, as would be apparent, from the aforementioned disclosure, to one of ordinary skill in the art. Further, the corresponding weighing scheme of each neighborhood processor, for any type of neighborhood processor contemplated above, would also be readily apparent, based upon the aforementioned disclosure, to one of ordinary skill in the art.

Finally, although it has been described that the global control PLD has been programmed to access each of the four processors A→D of the present invention, in sequence, from a pattern that repeats every 4th row and every 4th column, this should not, in any way, be considered limiting. From the aforementioned disclosure, it is readily recognizable to one of ordinary skill in the art that, based upon a type of compression desired and correspondingly, the types and number of neighborhood processors to be used, a similar row/column repeating pattern would be used to program the global control PLD. Thus, this neighborhood processor control device, the global control PLD, being programmable, should not be considered to be limited, in any way, to the embodiment of the present invention previously described.

Accordingly, the method, device and system of the present invention has been described, in one exemplary embodiment, in connection with a $3 \times 3 \rightarrow 2 \times 2$ compression. However, any type of compression can similarly be performed and thus the present invention should not be considered to be, in any way, limited to the exemplary embodiment. One of ordinary skill in the art, from the aforementioned disclosure and a desired compression ratio (input to output) could program the neighborhood processor control device to select and utilize appropriate neighborhood processors, in the appropriate sequential order, based upon a readily determinable pixel compression sequence pattern, without undue experimentation or delay.

From the above-described embodiments of the present invention, it is apparent that the present invention may be modified as would occur to one of ordinary skill in the art without departing from the scope of the present invention, which should be defined solely by the appended claims. Changes and modifications of the device, method and system contemplated by the present preferred embodiments will be apparent to one of ordinary skill in the art and should be held to be included herein.

We claim:

1. A preprocessing device for real-time pixel compression, comprising:
   a plurality of neighborhood processors, each when selected, for producing data of an output pixel of a different output pixel type predetermined by a preselected input-to-output pixel compression ratio, from a plurality of predetermined weighed pixel portions of a plurality of adjacent input pixels, predetermined based upon each output pixel type; and
   a control device for sequentially determining the output pixel type, for data of each sequential output pixel, based upon the preselected input-to-output pixel compression ratio, and for sequentially selecting one of said plurality of neighborhood processors corresponding to the determined output pixel type to sequentially control the plurality of neighborhood processors to produce data of a plurality of compressed output pixels from data of a plurality of input pixels in real-time.

2. The preprocessing device of claim 1 wherein each of the plurality of neighborhood processors includes:
   a coefficient file containing a fractional weighing matrix, predetermined with weighed pixel portions to be applied to a plurality of adjacent input pixels based upon a preselected input-to-output pixel compression ratio and a desired output pixel.

3. The preprocessing device of claim 2, wherein the coefficient file for each of the plurality of neighborhood processors contains a different fractional weighing matrix.

4. The preprocessing device of claim 1, wherein the number of plurality of neighborhood processors in the processing device is dependent upon a horizontal and vertical component of a desired output pixel matrix of the input-to-output pixel compression ratio.

5. The preprocessing device of claim 1, wherein the control device is a global control programmable logic device.

6. The preprocessing device of claim 5, wherein the global control programmable logic device is programmable to select any of the plurality of neighbor processors, sequentially, based upon the input-to-output pixel compression ratio.

7. An image compression system comprising:
scanning means for scanning an image and for producing input pixel data corresponding to the scanned image;
preprocessing means for receiving the input pixel data, the preprocessing means including,
a plurality of neighborhood processing means each when selected, for producing output pixel data of a different output pixel type predetermined by a preselected input-to-output pixel compression ratio, from a plurality of predetermined weighed pixel portions of a plurality of adjacent input pixels, predetermined based upon each output pixel type, and
a control device for sequentially determining the output pixel type, for data of each sequential output pixel, based upon the preselected input-to-output pixel compression ratio, and for sequentially selecting one of said plurality of neighborhood processing means corresponding to the determined output pixel type to sequentially control the plurality of neighborhood processing means to produce data of a plurality of compressed output pixels from the input pixel data, in real-time, and
a real-time processing means for processing the compressed output data in real-time.

8. The system of claim 7, wherein the scanning means is an infrared (IR) sensor.

9. The system of claim 8, wherein the infrared sensor is a second generation forward looking infrared (FLIR) sensor.

10. The system of claim 7, further comprising:

display video processing means for receiving the produced input pixel data simultaneous to the preprocessing means, and for processing the input pixel data for subsequent display; and
display means for displaying the processed noncompressed input pixel data.

11. The system of claim 10, further comprising:
input means for inputting instructions to the real-time processing means, wherein the real-time processing means is connected to the display means to enable analysis of the displayed input data based upon the input instructions.

12. A method of compressing input pixel data to output pixel data based upon a selected input-to-output compression ratio, comprising the steps of:
(a) inputting scanned input pixel data to a plurality of neighborhood processors;
(b) determining an output pixel type, based upon the selected input-to-output compression ratio;
(c) selecting one of the plurality of neighborhood processors, each for calculating data of an output pixel of a different output pixel type predetermined by the selected input-to-output compression ratio;
(d) calculating data of an output pixel, compressed by the selected input-to-output pixel compression ratio, by adding a plurality of weighed pixel portions of the scanned input pixel data of a plurality of predetermined adjacent input pixels, the weighed pixel portions of the adjacent input pixels being predetermined based upon each different output pixel type;
(e) repeating steps (a)-(d) to determine data for each compressed output pixel corresponding to the scanned input pixel data, based upon the selected input-to-output compression ratio, in real-time.

13. The method of claim 12 further comprising the step of:
(f) storing each calculated output pixel data in a real-time processor.

14. The method of claim 13, further comprising the
(g) inputting the scanned input pixel data to a display video processor, simultaneous input to the plurality of neighborhood processors of step (a);
(h) processing the input data of step (g) for display; and
(i) displaying the processed data.

15. The method of claim 14, further comprising the step of:
(j) inputting instructions to the real-time processor to analyze the displayed processed data.

16. The method of claim 12 wherein the input pixel data is data of a target detected between two pixels.

* * * * *